G. SPALDING.
TILLING MACHINE.
APPLICATION FILED APR. 22, 1910.
1,015,648.
Patented Jan. 23, 1912.
2 SHEETS—SHEET 1.
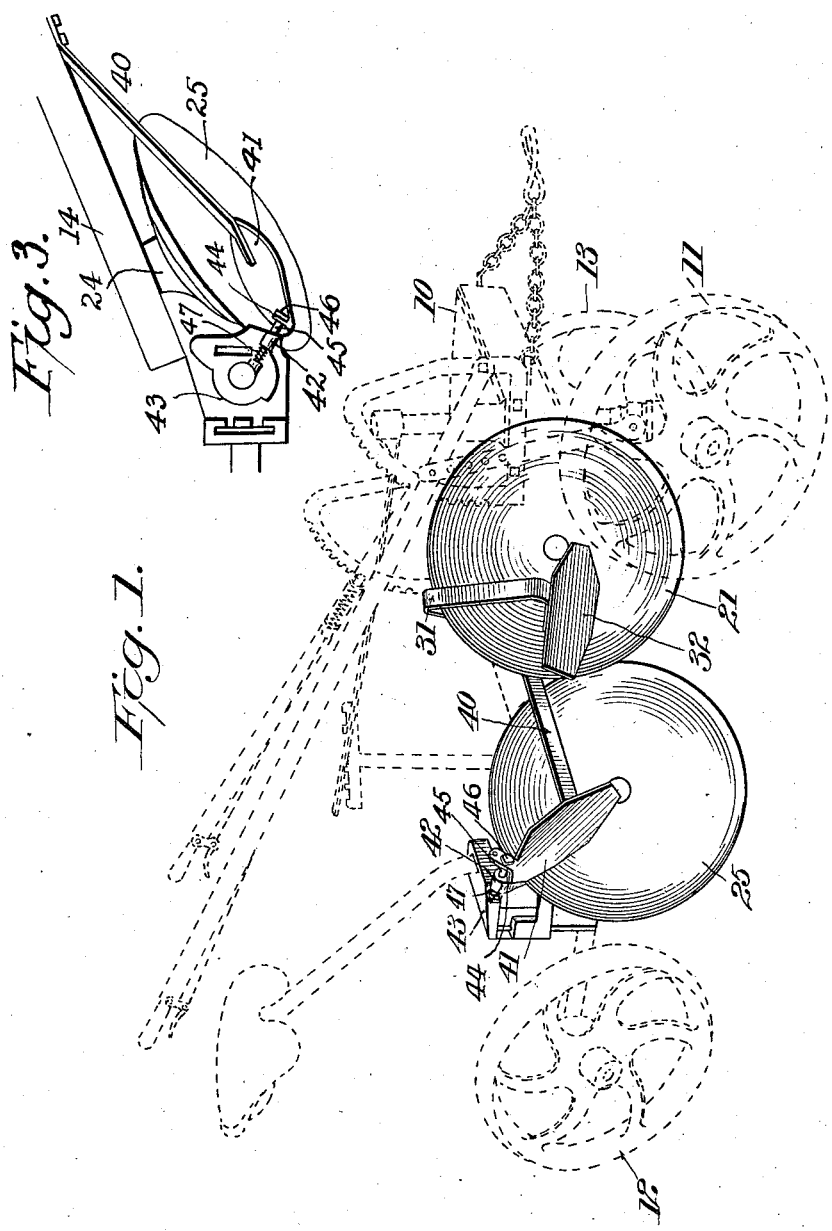
Witnesses
C. H. Walker.
E. Kintz
Inventor
George Spalding
By Hodges & Hodges
Attorney

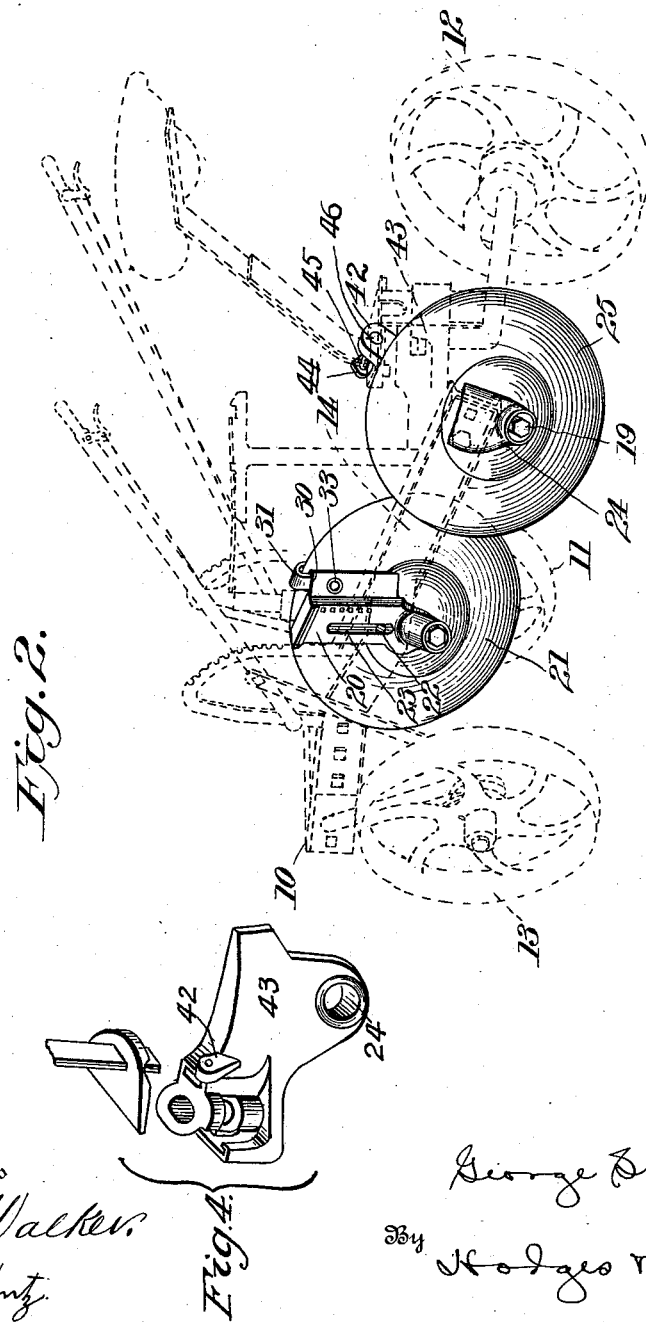

UNITED STATES PATENT OFFICE.

GEORGE SPALDING, OF CLEVELAND, OHIO, ASSIGNOR TO SPALDING PLOW COMPANY, OF PITTSBURGH, PENNSYLVANIA, A CORPORATION OF PENNSYLVANIA.

TILLING-MACHINE.

1,015,648.  Specification of Letters Patent.  Patented Jan. 23, 1912.

Application filed April 22, 1910. Serial No. 557,034.

*To all whom it may concern:*

Be it known that I, GEORGE SPALDING, a citizen of the United States, residing at Cleveland, in the county of Cuyahoga and State of Ohio, have invented new and useful Improvements in Tilling-Machines, of which the following is a specification.

This invention pertains to certain new and useful improvements in tilling machines, and relates more particularly to machines employing a plurality of rotary disks mounted in succession with each disk in advance, higher than, and partly to the land side of the next following disk.

The invention has for its object to provide an improved moldboard for the front disk adapted to ward off and turn the earth, as it is raised by the front disk, over into the bottom of the last preceding furrow.

A further object is to provide means for breaking apart and disintegrating the earth which is plowed by the said front disk.

A further object is to provide an improved moldboard for the rear disk to ward off and turn the earth over on to that plowed by the front disk.

A further object is to provide a tilling machine having a plurality of rotary disks mounted in succession with each disk in advance of, higher than and partly to the land side of the next following disk, and moldboards for each disk, the moldboard for each successive disk being elevated more at the rear end than the moldboard on the next preceding disk.

A further object is to so mount the moldboard of each disk with respect to its disk and to each other as to secure the objects above contemplated without interference with the normal operations of the disks themselves.

The invention will be hereinafter fully set forth and particularly pointed out in the claims.

In the accompanying drawing:—Figure 1 is a perspective view illustrating a tilling machine embodying my invention. Fig. 2 is a similar view from the opposite side of the machine. Fig. 3 is a plan view illustrating the rear disk and its adjuncts. Fig. 4 is a detail illustrating the casting for supporting the rear disk.

Referring to the drawing, 10 designates the frame of a tilling machine the same being provided with the front furrow wheel 11, the rear furrow wheel 12 and the land wheel 13, suitable levers being provided for raising and lowering the frame in accordance with the depth it is desired to plow. It will be noted that these parts are all indicated in dotted lines. The backbone 14 is extended to the rear and deflected downwardly toward the rear end and set with its axis in a vertical plane arranged diagonally with relation to the line of draft.

On the inside of the backbone is mounted the standard 20 carrying the journal for the front disk 21, said standard being adjustably secured in position by means of a bolt 22 passing through a slot 23 in the standard and rigidly engaging the backbone. Near the rear end of the backbone a casting 43 provided with a journal bearing 24 is securely attached in which is carried the journal 19 of the rear disk 25. The parts heretofore described are constructed and arranged substantially as illustrated and described in the Letters Patent above referred to. The standard 20 has an extension 30 provided with a recess or socket to receive one end of an approximately U-shaped arm 31 on the opposite end of which is mounted a moldboard 32. A bolt 33 or other securing means serves to hold said arm rigidly within said socket. The moldboard 32 is carried in a substantially horizontal position and at an elevation near the center of the front disk 21, the front end of the moldboard being approximately in vertical alinement with the supporting bolt of the disk, the rear end of the moldboard terminating just inside of the periphery of the disk. By means of this arrangement the moldboard turns the earth, as it is raised by the disk 21, over into the bottom of the last preceding furrow. It also serves to aid in breaking apart and disintegrating the earth plowed by said disk.

Rigidly secured to the backbone of the machine and extending rearwardly over the face of the rear disk 25 is an arm or brace 40, having a moldboard, 41, secured to the rear end thereof. It will be noted that this moldboard is set in a sloping position with its front end about the center of the disk and with its rear end much higher and at the edge of the disk, the rear upper end of said moldboard 41 being held in place by means of a bolt 46 passing through an ear 42 extending from the casting 43. The rear upper end of the moldboard 41 is provided with a shoulder 44 which rests against a spacing sleeve 45 encircling bolt 46 and interposed between said moldboard and said ear 42. A spring 47 encircling said bolt 46 acts to hold the shoulder 44 of the moldboard normally against said spacing sleeve, so that the edge of the moldboard, which conforms to the curvature of the disk, is held in place close to the disk. The rear moldboard 41 wards off and acts as a moldboard in turning the earth to its place.

In order to vary the position of moldboard 41 the shoulder 44 is provided with a plurality of openings 48 through any one of which the bolt 46 may be passed.

In practice the earth which is plowed by the front disk is not as thoroughly torn apart by the action of the disk itself as is the earth which is plowed by the rear disk and carried much higher on the face of the revolving disk. The front moldboard 32 therefore serves to break the sod and earth apart and abruptly change its course laterally and downwardly. The rear moldboard wards off the earth and acts as a moldboard to turn the earth plowed by the rear furrow, over and on top of that plowed by the front disk. The position of each moldboard on its disk is very material, since, by its use the earth is discharged from the disk regularly. The moldboard serves in breaking apart and pulverizing the earth as lifted by the disk and discharges the pulverized earth at a uniform elevation. This serves to destroy the "furrow slice", that is, instead of the earth being left in ridges or "furrow slices", as in the case when a moldboard plow is used, the earth that is turned by the rotary disks equipped with moldboards as herein described, is left, approximately level on top, and in a suitable and fit condition for a seed bed and so that little, if any, additional preparation is required by means of a harrow or otherwise.

I claim as my invention:—

1. In a tilling machine the combination with a plurality of rotary disks mounted in succession with each disk in advance, higher than, and partly to the land side of the next following disk, and a moldboard mounted adjacent each disk for controlling the discharge of earth plowed by said disks, the moldboards of the respective disks being arranged at different angles.

2. In a tilling machine the combination with a plurality of rotary disks mounted in succession with each disk in advance, higher than, and partly to the land side of the next following disk, and a moldboard mounted adjacent each disk for controlling the discharge of earth plowed by said disks, the moldboards for the front or leading disk being mounted in a substantially horizontal position and approximately in line with the center of the disk, the moldboard of each succeeding disk being supported in a sloping position with the front end near the center of the disk the rear end of said moldboard being elevated.

3. In a tilling machine the combination with a plurality of rotary disks mounted in succession with each disk in advance, higher than and partly to the land side of the next following disk, of a horizontally arranged moldboard for the front disk, and an inclined moldboard for the rear disk.

4. In a tilling machine the combination with a plurality of rotary disks mounted in succession with each disk in advance, higher than, and partly to the land side of the next following disk, of a moldboard for the front disk, and a moldboard for the rear disk, the moldboards of the respective disks being arranged at different angles, the moldboard for the rear disk having its rear end above the center of said disk.

5. In a tilling machine the combination with a plurality of rotary disks mounted in succession with each disk in advance, higher than, and partly to the land side of the next following disk, of a horizontally arranged moldboard for the front disk, and an inclined moldboard for the rear disk arranged with its rear end above the center of said disk.

6. In a tilling machine the combination with a plurality of rotary disks mounted in succession with each disk in advance, higher than, and partly to the land side of the next following disk, of a moldboard for the front disk, means for adjusting said front disk, means for adjusting said moldboard, and a moldboard for the rear disk arranged with its rear end above the center of said disk.

7. In a tilling machine the combination with a plurality of rotary disks mounted in succession with each disk in advance, higher than, and partly to the land side of the next following disk, an adjustable standard for supporting the front disk, an arm rigidly mounted in said standard, a moldboard carried by said arm, and a moldboard for the rear disk arranged with its rear end above the center of said rear disk.

In testimony whereof I have hereunto set my hand in presence of two subscribing witnesses.

GEORGE SPALDING.

Witnesses:
L. Ross Ellett,
L. C. Cecil.